(12) United States Patent
Yagi et al.

(10) Patent No.: US 10,284,133 B2
(45) Date of Patent: May 7, 2019

(54) INVERTER DEVICE AND OUTDOOR UNIT OF HEAT PUMP DEVICE

(71) Applicant: DAIKIN INDUSTRIES, LTD., Osaka-shi, Osaka (JP)

(72) Inventors: Satoshi Yagi, Osaka (JP); Kazuya Hirahara, Osaka (JP); Daisuke Oshimi, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/890,609

(22) Filed: Feb. 7, 2018

(65) Prior Publication Data

US 2018/0226911 A1    Aug. 9, 2018

(30) Foreign Application Priority Data

Feb. 8, 2017   (JP) .................................. 2017-021004

(51) Int. Cl.
| | | |
|---|---|---|
| *H02M 1/32* | (2007.01) | |
| *H02M 7/5387* | (2007.01) | |
| *H02P 27/08* | (2006.01) | |
| *H02P 29/62* | (2016.01) | |
| *H02P 29/68* | (2016.01) | |
| *F25B 31/02* | (2006.01) | |

(52) U.S. Cl.
CPC .............. *H02P 27/08* (2013.01); *F25B 31/02* (2013.01); *H02M 7/53871* (2013.01); *H02P 29/62* (2016.02); *H02P 29/68* (2016.02); *F25B 2400/01* (2013.01); *F25B 2500/31* (2013.01); *H02M 2001/327* (2013.01); *H02P 2201/03* (2013.01)

(58) Field of Classification Search
CPC ...... H02P 1/00; H02P 3/00; H02P 6/00; H02P 23/12; H02P 1/46; H02P 3/18; H02P 1/24; H02P 1/42; H02P 27/04; H02P 27/06; H02P 23/00; H02P 27/00; H02K 17/32; G05B 11/28; G05B 5/00; G05D 23/00
USPC ..... 318/400.01, 472, 400.14, 700, 701, 727, 318/599, 799, 800, 801, 471; 123/453
See application file for complete search history.

(56) References Cited

U.S. PATENT DOCUMENTS

| 9,160,255 B2* | 10/2015 | Greetham ............... H02P 1/465 |
| 2006/0130504 A1* | 6/2006 | Agrawal ................. F25B 49/02 |
| | | 62/228.4 |

FOREIGN PATENT DOCUMENTS

JP    4821507 B2    11/2011

\* cited by examiner

*Primary Examiner* — Antony M Paul
(74) *Attorney, Agent, or Firm* — Birch, Stewart, Kolasch & Birch, LLP

(57) ABSTRACT

An inverter device converts DC to AC and supplies power to a load (motor), and includes a temperature sensor that directly or indirectly detects a temperature of the inverter device; a DC link including a smoothing capacitor; an inverter circuit provided between the DC link and the load (motor); and a control unit that controls the inverter circuit. The control unit forcefully passes a current through the DC link when an instruction to allow the inverter circuit to operate is not received and when the temperature detected by the temperature sensor is less than or equal to a predetermined temperature.

8 Claims, 5 Drawing Sheets

INVERTER DEVICE AND OUTDOOR UNIT OF HEAT PUMP DEVICE

TECHNICAL FIELD

The present disclosure relates to an inverter device that may be used at lower ambient temperatures than the lower limit value of its operation guarantee temperature, and an outdoor unit of a heat pump device to which the inverter device is mounted.

BACKGROUND ART

An outdoor unit of, for example, an air conditioner used in a cold region may start up at an ambient temperature lower than, for example, −30° C. Even in such a case, a compressor can start up. However, performance immediately after start-up cannot be guaranteed. This is because the operation of electric parts such as an inverter device cannot be guaranteed at −30° C. under the present circumstances.

It is known that the start-up of not only an air conditioner but also electrical equipment at low temperatures causes a problem of, for example, a reduction in the performance of a CPU. For measures against it, use of a heating element is also proposed (see, for example, Patent Literature 1, paragraph [0017] and claim 1).

CITATION LIST

Patent Literature

Patent Literature 1: Japanese Patent No. 4821507

SUMMARY OF INVENTION

Technical Problem

However, the addition of a part such as a heating element increases the number of parts, which also leads to an increase in cost. Thus, the addition of a part is not desirable.

In view of such a problem, an object of the present disclosure is to enable an inverter device to securely exert its performance, using an existing part even if the inverter device starts up at a lower ambient temperature than its operation guarantee temperature.

Solution to Problem (1) The present specification discloses an inverter device that converts DC to AC and supplies power to a load, the inverter device including: a temperature sensor that directly or indirectly detects a temperature of the inverter device; a DC link including a smoothing capacitor; an inverter circuit provided between the DC link and the load; and a control unit that controls the inverter circuit, the control unit being configured to forcefully pass a current through the DC link when an instruction to allow the inverter circuit to operate is not received and when the temperature detected by the temperature sensor is less than or equal to a predetermined temperature.

Such an inverter device causes electrical loss (e.g., at least loss by an internal resistor of a soothing capacitor) by forcefully passing a current through the DC link, when the temperature of the inverter device (except the temperature sensor) is lower than the lower limit value of its operation guarantee temperature due to, for example, a low ambient temperature. As a result, the inverter device can be warmed up by heat generation resulting from the electrical loss. By thus maintaining temperatures greater than or equal to the lower limit value of the operation guarantee temperature, even when the ambient temperature is very low, the inverter device is always used within an operation guarantee temperature range, enabling the inverter device to securely exert its performance.

(2) In addition, in the inverter device of (1), after forcefully passing a current through the DC link, the control unit may allow the inverter circuit to perform heating operation, and stop the heating operation when the temperature reaches the predetermined temperature.

In this case, the inverter device can be warmed up by heating operation in addition to the forced passage of a current through the DC link.

(3) In addition, in the inverter device of (2), the load may be a motor, and the heating operation may be performed by the control unit causing switching loss in the inverter circuit by allowing a pulse current to repeatedly and alternately flow through a coil of the motor in one direction and an opposite direction to the one direction.

In this case, a momentary current of an amount corresponding to a pulse width flows through the coil of the motor, but a current in the opposite direction flows through immediately thereafter, which is repeated. Thus, it is substantially equal to that a current generating a rotating torque is not flowing through. Therefore, the motor does not rotate. On the other hand, however, the inverter circuit generates heat by switching loss, enabling to warm up the inverter device.

(4) In addition, in the inverter device of (2), the load may be a three-phase motor, and the heating operation may be performed by the control unit performing open-phase driving on the three-phase motor.

In this case, though it is open-phase driving, the inverter device and the motor are warmed up by the passage of a current through the motor.

(5) On the other hand, the present specification discloses an outdoor unit of a heat pump device, an inverter device described in any one of the above-described (1) to (4) being mounted on the outdoor unit.

In such a heat pump device, even when the ambient temperature is very low, the inverter device placed outdoors is always used within an operation guarantee temperature range, enabling the inverter device to securely exert its performance.

DESCRIPTION OF EMBODIMENTS

<<Example of Configuration>>

Figure 1:
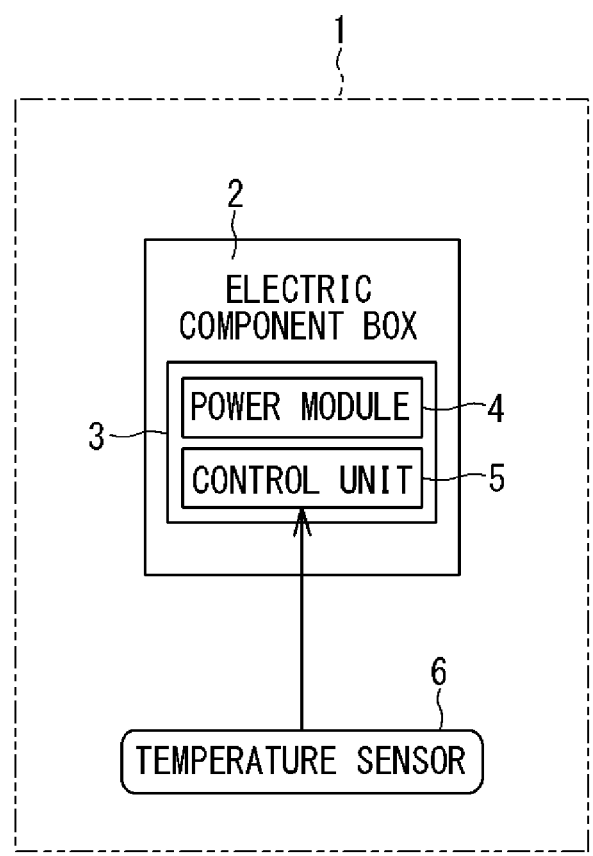
FIG. 1 is a diagram conceptually and simply showing some electric elements of an outdoor unit of an air conditioner.

FIG. 1 is a diagram conceptually and simply showing some electric elements of an outdoor unit 1 of, for example, an air conditioner. In the outdoor unit 1 there is provided, for example, an electric component box 2 for putting together and storing electric components. In the electric component box 2 is provided a control board 3. The control board 3 has a power module 4, a control unit 5, and other electronic parts mounted thereon. A temperature sensor 6 is provided, for example, near an air suction port (not shown) to detect an outdoor temperature, and provides its detection output to the control unit 5.

Figure 2:
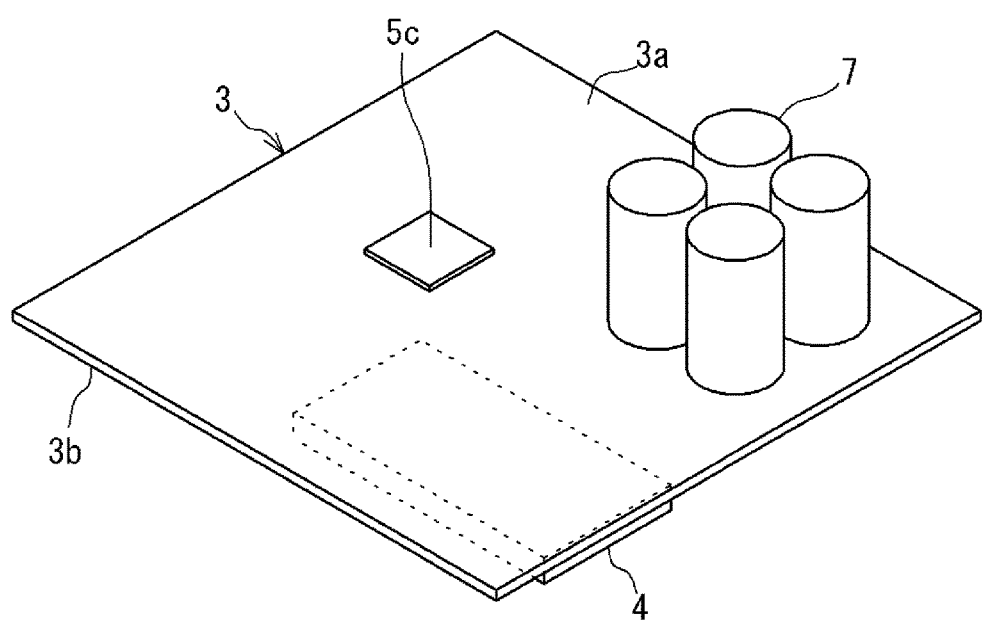
FIG. 2 is a perspective view showing an example of a schematic external image of a control board.

FIG. 2 is a perspective view showing an example of a schematic external image of the control board 3. On the side of a front surface 3a of the control board 3 there are mounted, for example, a CPU 5c which forms the control unit 5, and smoothing capacitors 7. On the other hand, on the side of a back surface 3b there is mounted the power module 4. Therefore, those parts are easily thermally conducted to each other through the control board 3. Note that the disposition of the parts is simply an example and the location of the disposition is not limited to this example.

<<Example of a Circuit Diagram>>

Figure 3:
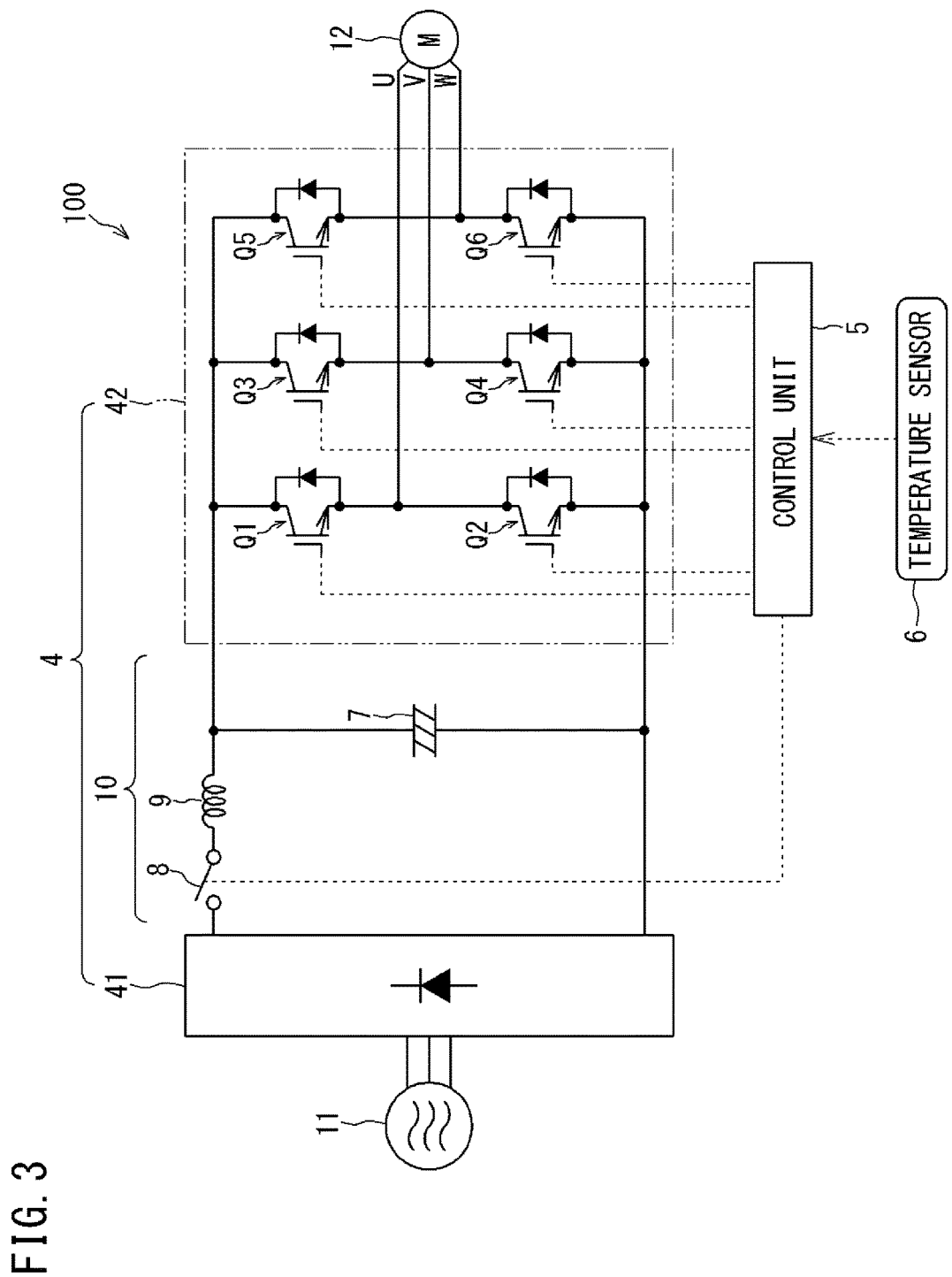
FIG. 3 is a circuit diagram of an inverter device.

FIG. 3 is a circuit diagram of an inverter device 100. In the drawing, with a main relay 8 being closed, an AC voltage which is supplied from a three-phase AC power supply 11 is rectified by a rectifier circuit 41 and then smoothed by a reactor 9 and a smoothing capacitor 7, and becomes a DC voltage. A DC circuit portion on the output side of the rectifier circuit 41 is referred to as DC link 10.

An inverter circuit 42 forms a full bridge by switching elements Q1, Q2, Q3, Q4, Q5, and Q6. A motor 12 of a compressor is connected to the AC output side of the inverter circuit 42. Each of the switching elements Q1 to Q6 is, for example, as shown in the drawing, an insulated gate bipolar transistor (IGBT) having a reverse-parallel diode. The rectifier circuit 41 and the inverter circuit 42 are made into a module and thus look like the integrated power module 4. The DC link 10 portion (the main relay 8, the reactor 9, and the smoothing capacitor 7) is provided, for example, external to the power module 4 through a connecting terminal of the power module 4.

The opening and closing of the main relay 8 and the switching operation of the switching elements Q1 to Q6 are performed by the control unit 5. The control unit 5 includes a memory, an interface, etc. (not shown) in addition to the CPU 5c (FIG. 2), and performs the opening and closing of the main relay 8 and the switching operation of the switching elements Q1 to Q6 by executing software. In addition, a detection output from the temperature sensor 6 is transmitted to the control unit 5.

<<Operation for Normal Operation>>

When a user performs an on operation on a remote control device (not shown) on the indoor unit side of the air conditioner, an on-operation instruction reaches the control unit 5. The control unit 5 first closes the main relay 8. By this, the smoothing capacitor 7 is charged, and an output from the rectifier circuit 41 is smoothed by the smoothing capacitor 7 together with the reactor 9. In addition, the switching elements Q1 to Q6 perform PWM-controlled switching operation by control of the control unit 5. By this, the motor 12 rotates.

In addition, when the user performs an off operation on the remote control device on the indoor unit side of the air conditioner, an off-operation instruction reaches the control unit 5. The control unit 5 stops the switching operation of the switching elements Q1 to Q6 and opens the main relay 8.

<<Heating Operation Performed While Operation is Stopped>>

Figure 4:
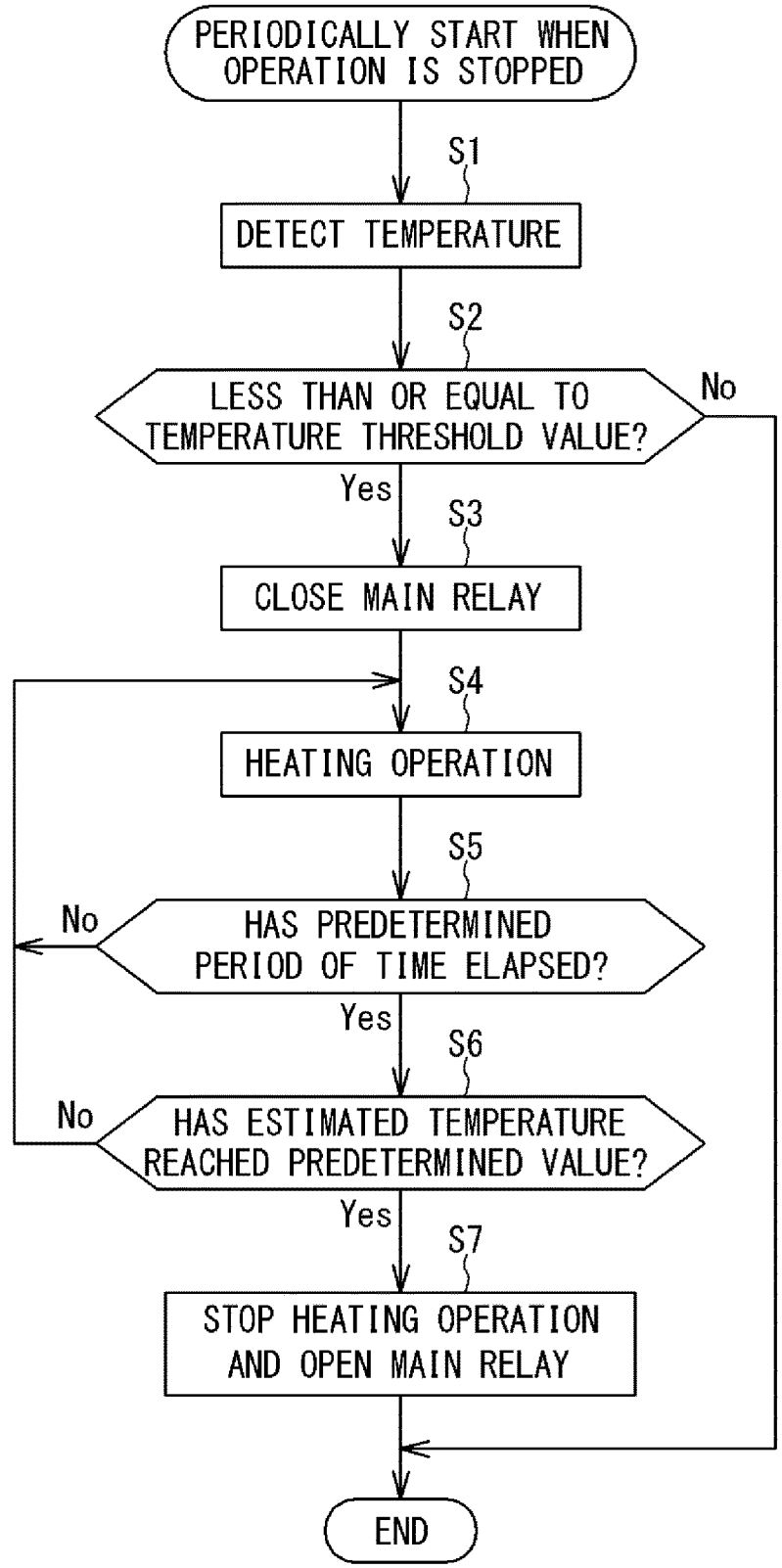
FIG. 4 is a flowchart showing an example of heating operation.

Next, heating operation performed while the operation of the air conditioner is stopped will be described. FIG. 4 is a flowchart showing an example of heating operation. A subject that performs the flowchart is the control unit 5. A heating operation process shown in FIG. 4 is periodically performed when operation is sopped.

In the drawing, when a heating operation process starts, the control unit 5 detects a temperature (outdoor temperature) by a detection output from the temperature sensor 6 (step S1), and determines whether the temperature is less than or equal to a temperature threshold value (step S2). Here, if the detected temperature is not less than or equal to the temperature threshold value, heating is not required and thus the process ends. The temperature threshold value is the lower limit value of an operation guarantee temperature of the inverter device 100 and is, for example, −25° C. Note that here the outdoor temperature is considered to be roughly equal to the temperature of the inverter device 100.

On the other hand, if the temperature is less than or equal to the temperature threshold value, the control unit 5 closes the main relay 8 (step S3). When the main relay 8 is closed, the smoothing capacitor 7 is charged. Since the smoothing capacitor 7 has an internal resistor, by a current flowing through the internal resistor, electrical loss occurs, which becomes a heating source. In addition, since the reactor 9 and the rectifier circuit 41 also have some resistors, some electrical loss also occurs by the resistors, and heat is slightly generated.

Furthermore, the control unit 5 performs heating operation (step S4). A specific example of the heating operation will be described later. After the start of the heating operation, the control unit 5 waits for a predetermined period of time to elapse (step S5). When the predetermined period of time has elapsed, the control unit 5 determines whether an estimated temperature of the inverter device 100 has reached a predetermined value (step S6). Here, the estimated temperature is a temperature for the outdoor temperature that the temperature of the inverter device 100 is estimated to have reached by performing heating operation for the predetermined period of time, and the estimated temperature can be easily obtained by experiment in advance. In addition, the predetermined value is, for example, −20° C. for the aforementioned temperature threshold value "−25° C.". Heating operation is performed until the estimated temperature reaches the predetermined value. When the estimated temperature reaches the predetermined value, the control unit 5 stops the heating operation and opens the main relay 8 (step S7), and ends the process.

<<Example of Heating Operation>>

The above-described heating operation can be performed, for example, in the following manner.

Figure 5:
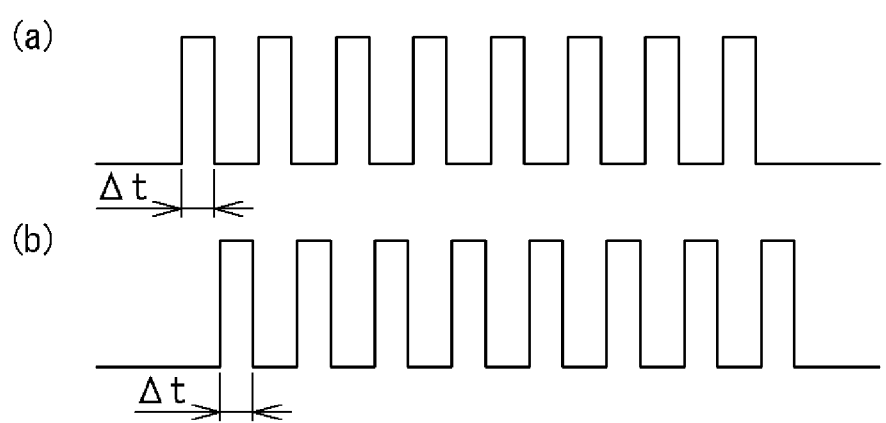
FIG. 5 is a diagram showing examples of gate pulses used upon heating operation.

FIG. 5 is a diagram showing examples of gate pulses used upon heating operation. For example, considering allowing a current to flow through a coil between the U and V lines of the motor 12 of FIG. 3, (a) of FIG. 5 is, for example, gate pulses for the switching elements Q1 and Q4. (b) of FIG. 5 is gate pulses for the switching elements Q2 and Q3. The respective pulses in (a) and (b) are of equal width (equal time) Δt, and on and off are alternately switched. The pulses in (a) and (b) are alternately switched to "on". In addition, dead time is set in order that pulses are not simultaneously switched to "on" at the moment of switching operation from "on" in (a) to "on" in (b). The pulse frequency is, for example, on the order of kHz.

When such gate pulses are provided, a current flows through the coil during a short period of time "Δt", but a current in the opposite direction flows through immediately thereafter, which is repeated. Thus, it is substantially equal to that a current generating a rotating torque is not flowing through. Therefore, the motor 12 does not rotate. However, by the switching operation of the switching elements Q1 to Q4, switching loss occurs. By the switching loss, the inverter circuit 42 is warmed up, resulting in warming up the entire inverter device 100 including the power module 4.

Note that when considering allowing a current to flow through a coil between the V and W lines of the motor 12, the same is performed for the switching elements Q3, Q4, Q5, and Q6. Likewise, when considering allowing a current to flow through a coil between the U and W lines of the motor 12, the same is performed for the switching elements Q1, Q2, Q5, and Q6.

<<Another Example of Heating Operation>>

In addition, as heating operation, aside from the above-described control, open-phase operation of the motor 12 may be performed. In this case, a current is allowed to flow through only one of between U and V, between V and W, and between W and U among the U, V, and W of the motor 12. A drive current for this case is the same as that used upon normal driving, and just open-phase takes place in a drive method. In this case, too, switching loss occurs in the inverter circuit 42. By the switching loss, the inverter circuit 42 is warmed up, resulting in warming up the entire inverter device 100 including the power module 4. In addition, in this case, since a reasonable current also flows through a coil of the motor 12, the motor 12 is also heated. By this, the compressor is heated, which also contributes to the separation of refrigerant dissolved in oil.

<<For the Position of the Temperature Sensor>>

Note that the above-described embodiment shows an example of using a temperature sensor that detects an outdoor temperature. Since such a temperature sensor is originally provided, there is an advantage in that there is no need to newly add a part. Note, however, that since the temperature of the power module 4 is not directly detected, a temperature check performed upon stopping heating operation is estimation, resulting in indirect detection. In view of this, by providing a temperature sensor that directly detects the temperature of the power module 4, heating operation can be more accurately started and stopped based on the actual temperature, without depending on estimation. Namely, the present disclosure does not exclude the provision of a temperature sensor that directly detects the temperature of the power module 4.

<<Summary>>

As described above, in the inverter device 100 of the present embodiment, the control unit 5 forcefully passes a current through the DC link 10 when an instruction to allow the inverter circuit 42 to operate is not received and when a temperature detected by the temperature sensor 6 is less than or equal to a predetermined temperature.

Such an inverter device 100 causes electrical loss (e.g., at least loss by the internal resistor of the soothing capacitor 7) by forcefully passing a current through the DC link 10, when the temperature of the inverter device (except the temperature sensor 6) 100 is lower than the lower limit value of its operation guarantee temperature due to a low ambient temperature. As a result, the inverter device 100 can be warmed up by heat generation resulting from the electrical loss. By thus maintaining temperatures greater than or equal to the lower limit value of the operation guarantee temperature, even when the ambient temperature is very low, the inverter device 100 is always used within an operation guarantee temperature range, enabling the inverter device 100 to securely exert its performance.

Then, a load of the inverter device 100 is, for example, the motor 12. The control unit 5 can cause switching loss in the inverter circuit 42 by allowing pulse currents of equal width to repeatedly and alternately flow through a coil of the motor 12 in one direction and an opposite direction thereto.

In this case, a momentary current of an amount corresponding to a pulse width (Δt) flows through the coil of the motor 12, but a current in the opposite direction flows through immediately thereafter, which is repeated. Thus, it is substantially equal to that a current generating a rotating torque is not flowing through. Therefore, the motor 12 does not rotate. On the other hand, however, the inverter circuit 42 generates heat by switching loss, enabling to warm up the inverter device 100. Note that although it is preferred that the pulse currents have "equal width", even if the pulse currents do not have equal width, the function and effect of causing switching loss while suppressing rotating torque can be obtained.

In addition, heating operation can also be performed by open-phase driving.

In this case, though it is open-phase driving, the inverter device 100 and the motor 12 are warmed up by the passage of a current through the motor 12.

<<Others>>

Note that although the above-described embodiment describes an inverter device in an outdoor unit of an air conditioner, the inverter device is not limited to one for an air conditioner, and can also be widely used as an inverter device in an outdoor unit of a heat pump device. In addition, since a heat pump water heater is also a kind of heat pump device, the same inverter device can be mounted on the outdoor unit.

Furthermore, such an inverter device with, so to speak, a thermal insulation function can be applied not only to devices having a refrigerating cycle, but also to various types of electrical equipment whose inverter device is mounted outdoors in cold regions (electrical equipment that has the possibility of being used at lower temperatures than the lower limit value of its operation guarantee temperature).

<<Supplemental Remarks>>

Although the embodiment of the present invention has been described above, it will be understood that various changes may be made to the embodiment and details without departing from the spirit and scope of the present invention recited in the claims.

REFERENCE SIGNS LIST

1: OUTDOOR UNIT
2: ELECTRIC COMPONENT BOX
3: CONTROL BOARD
3a: FRONT SURFACE
3b: BACK SURFACE
4: POWER MODULE
5: CONTROL UNIT
5c: CPU
6: TEMPERATURE SENSOR
7: SMOOTHING CAPACITOR
8: MAIN RELAY
9: REACTOR
10: DC LINK
11: AC POWER SUPPLY
12: MOTOR
41: RECTIFIER CIRCUIT
42: INVERTER CIRCUIT
100: INVERTER DEVICE

What is claimed is:

1. An inverter device that converts DC to AC and supplies power to a load, the inverter device comprising:

a temperature sensor that directly or indirectly detects a temperature of the inverter device;

a DC link including a smoothing capacitor:

an inverter circuit provided between the DC link and the load; and a control unit that controls the inverter circuit the control unit being configured to forcefully pass a current through the DC link to generate heat by the DC link when an instruction to allow the inverter circuit to operate is not received and when the temperature detected by the temperature sensor is less than or equal to a predetermined temperature.

2. An outdoor unit of a heat pump device, an inverter device according to claim 1 being mounted to the outdoor unit.

3. An inverter device that converts DC to AC and supplies power to a load, the inverter device comprising:

a temperature sensor that directly or indirectly detects a temperature of the inverter device:

a DC link including a smoothing capacitor;

an inverter circuit provided between the DC link and the load; and a control unit that controls the inverter circuit, the control unit being configured to forcefully pass a current through the DC link when an instruction to allow the inverter circuit to operate is not received and when the temperature detected by the temperature sensor is less than or equal to a predetermined temperature, wherein after forcefully passing a current through the DC link, the control unit allows the inverter circuit perform heating operation, and stops the heating operation when the temperature reaches the predetermined temperature.

4. The inverter device according to claim 3, wherein the load is a motor, and the heating operation is performed by the control unit causing switching loss in the inverter circuit by allowing a pulse current to repeatedly and alternately flow through a coil of the motor in one direction and an opposite direction to the one direction.

5. An outdoor unit of a heat pump device, an inverter device according to claim 4 being mounted to the outdoor unit.

6. The inverter device according to claim 3, wherein the load is a three-phase motor, and the heating operation is performed by the control unit performing open-phase driving on the three-phase motor.

7. An outdoor unit of a heat pump device, an inverter device according to claim 6 being mounted to the outdoor unit.

8. An outdoor unit of a heat pump device, an inverter device according to claim 3 being mounted to the outdoor unit.

* * * * *